(12) United States Patent
Swaminathan et al.

(10) Patent No.: US 11,743,058 B2
(45) Date of Patent: Aug. 29, 2023

(54) NVDIMM SECURITY WITH PHYSICALLY UNCLONABLE FUNCTIONS

(71) Applicant: International Business Machines Corporation, Armonk, NY (US)

(72) Inventors: Janani Swaminathan, Porur (IN); Trinadhachari Kosuru, Bangalore (IN); Anand Haridass, Bangalore (IN); Santosh Balasubramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/809,727

(22) Filed: Mar. 5, 2020

(65) Prior Publication Data

US 2021/0281431 A1 Sep. 9, 2021

(51) Int. Cl.
*H04L 9/32* (2006.01)
*G06F 12/14* (2006.01)

(52) U.S. Cl.
CPC ........ *H04L 9/3278* (2013.01); *G06F 12/1483* (2013.01); *H04L 9/3273* (2013.01); *G06F 2212/1052* (2013.01)

(58) Field of Classification Search
CPC . H04L 9/3278; H04L 9/3273; G06F 12/1483; G06F 2212/1052
USPC .......................................................... 713/169
See application file for complete search history.

(56) References Cited

U.S. PATENT DOCUMENTS

| | | | |
|---|---|---|---|
| 9,948,470 B2 * | 4/2018 | Guo | G06F 7/588 |
| 10,242,175 B2 * | 3/2019 | Teegavarapu | G06F 21/44 |
| 10,476,680 B2 | 11/2019 | Wong | |
| 11,271,759 B2 * | 3/2022 | Cambou | H04L 9/0643 |
| 11,411,747 B2 * | 8/2022 | Van Antwerpen | G06F 3/0622 |
| 2009/0083833 A1 * | 3/2009 | Ziola | G06F 21/31 726/2 |
| 2009/0138727 A1 * | 5/2009 | Campello de Souza | G06F 21/80 713/193 |
| 2009/0164789 A1 * | 6/2009 | Carvounas | G06F 21/445 713/176 |
| 2009/0222910 A1 * | 9/2009 | Le Bihan | H04L 9/3273 726/19 |
| 2010/0138652 A1 * | 6/2010 | Sela | H04L 9/3228 713/158 |

(Continued)

OTHER PUBLICATIONS

Chen et al., "Intrinsic Physical Unclonable Function (PUF) Sensors in Commodity Devices", sensors, MDPI, Published: May 28, 2019, Sensors 2019, 19, 2428; doi:10.3390/s19112428, 15 pages.

*Primary Examiner* — Dereena T Cattungal
(74) *Attorney, Agent, or Firm* — David B. Woycechowsky (57) ABSTRACT

Authenticating a host computer and NVDIMM pair using lookup tables for a challenge/response exchange between the pair of devices. The NVDIMM is challenged by the host computer for which a response associated with the physically unclonable function of a NVDIMM component is provided. The NVDIMM challenges the host computer for which a response associated with the physically unclonable function of a host computer component is provided. Additional security stores a modified response associated with run-time physically unclonable functions associated with the host computer and NVDIMM pair for use in future challenge/response exchanges.

6 Claims, 5 Drawing Sheets

(56) References Cited

U.S. PATENT DOCUMENTS

| | | | |
|---|---|---|---|
| 2010/0250936 A1* | 9/2010 | Kusakawa | H04L 9/3278 713/169 |
| 2011/0016317 A1* | 1/2011 | Abe | H04L 9/3231 713/169 |
| 2012/0304281 A1* | 11/2012 | Kang | G06F 21/445 726/16 |
| 2013/0262877 A1* | 10/2013 | Neve De Mevergnies | G06F 16/21 726/19 |
| 2014/0006738 A1* | 1/2014 | Nagai | G06F 21/78 711/E12.091 |
| 2016/0093393 A1* | 3/2016 | Park | G11C 16/10 380/28 |
| 2017/0005811 A1* | 1/2017 | Tremlet | H04L 63/0823 |
| 2017/0242660 A1* | 8/2017 | Katoh | G11C 13/0007 |
| 2017/0288885 A1* | 10/2017 | Khatib Zadeh | G09C 1/00 |
| 2017/0345492 A1* | 11/2017 | Yoshimoto | G11C 7/24 |
| 2018/0006830 A1* | 1/2018 | Cambou | G06F 11/2268 |
| 2018/0183613 A1* | 6/2018 | Dafali | G09C 1/00 |
| 2019/0042480 A1* | 2/2019 | Khatib Zadeh | G11C 29/44 |
| 2019/0114115 A1* | 4/2019 | Wille | G06K 19/0723 |
| 2019/0114428 A1 | 4/2019 | Kim | |
| 2019/0325142 A1* | 10/2019 | Trikalinou | G06F 12/1433 |
| 2020/0213140 A1* | 7/2020 | Cambou | H04L 9/3278 |
| 2020/0365222 A1* | 11/2020 | Lee | G11C 17/18 |
| 2020/0396092 A1* | 12/2020 | Cambou | H04L 9/3234 |
| 2021/0049309 A1* | 2/2021 | Su | G06F 3/0623 |
| 2021/0200889 A1* | 7/2021 | Iwasaki | G06F 21/6227 |
| 2022/0029836 A1* | 1/2022 | Qureshi | G06F 21/44 |
| 2022/0166638 A1* | 5/2022 | Razi | H04L 9/3278 |

* cited by examiner

NVDIMM SECURITY WITH PHYSICALLY UNCLONABLE FUNCTIONS

BACKGROUND

The present invention relates generally to the field of NVDIMM computer memory, and more particularly to data security when using NVDIMM memory.

The Wikipedia entry for "NVDIMM" (as of Jan. 21, 2020) states as follows: "A non-volatile dual in-line memory module (NVDIMM) is a type of random-access memory for computers. Non-volatile memory is memory that retains its contents even when electrical power is removed, for example from an unexpected power loss, system crash, or normal shutdown. "Dual in-line" identifies the memory as using the DIMM package. NVDIMMs improve application performance and system crash recovery time. They enhance solid-state drive (SSD) endurance and reliability."

NVDIMM-N and NVDIMM-P according to JEDEC standard incorporates DRAM, non-volatile memory, control logic, and an independent power source to retain critical in-memory data through unexpected power loss events, system crashes or planned shutdowns. During normal operation, the NVDIMM-N appears to the host system as a standard DRAM memory module, providing the speed, latency and endurance benefits of DRAM. In the event of an unexpected power loss or system crash, the critical data residing in the DRAM is saved to non-volatile memory. When power is returned, the in-memory state of the DRAM is restored from non-volatile memory. NVDIMM-F would appear as a slower memory but does not suffer data loss during power recycle. PUF stands for physically unclonable function and are mainstream security features in many IoT (internet of things) hardware. PUF signatures can be generated using any variations (process, electrical) of the hardware and can be used as a unique signature of that hardware.

A memory controller is a digital circuit that manages the flow of data going to and from the main memory of a computing device. A memory controller sometimes takes the form of a separate chip and sometimes is integrated into another chip, such as being placed on the same die or as an integral part of a microprocessor. When incorporated into the microprocessor, it is usually called an integrated memory controller (IMC). A memory controller is sometimes also called a memory chip controller (MCC) or a memory controller unit (MCU).

The Wikipedia entry for "physical unclonable function" (as of Feb. 5, 2020) states as follows: "A physical unclonable function (sometimes also called physically unclonable function), or PUF, is a physical object that for a given input and conditions (challenge), provides a physically-defined "digital fingerprint" output (response) that serves as a unique identifier, most often for a semiconductor device such as a microprocessor. PUFs are most often based on unique physical variations which occur naturally during semiconductor manufacturing. A PUF is a physical entity embodied in a physical structure. Today, PUFs are usually implemented in integrated circuits and are typically used in applications with high security requirements, more specifically cryptography.

The Wikipedia entry for "public key infrastructure" (as of Feb. 5, 2020) states as follows: "A public key infrastructure (PKI) is a set of roles, policies, hardware, software and procedures needed to create, manage, distribute, use, store and revoke digital certificates and manage public-key encryption. The purpose of a PKI is to facilitate the secure electronic transfer of information for a range of network activities such as e-commerce, internet banking and confidential email. It is required for activities where simple passwords are an inadequate authentication method and more rigorous proof is required to confirm the identity of the parties involved in the communication and to validate the information being transferred".

SUMMARY

According to an aspect of the present invention, there is a method, computer program product and/or system for authenticating a host/NVDIMM pair that performs the following operations (not necessarily in the following order): (i) transmitting a first challenge to a non-volatile dual in-line memory module (NVDIMM) installed in a host computer; (ii) receiving, from the NVDIMM, a first response to the first challenge, the first response including a second challenge; (iii) generating, by the host computer, a second response to the second challenge; (iv) sending the second response and a first acknowledgement of the first response to the NVDIMM; (v) receiving, from the NVDIMM, a second acknowledgement of the second response; and (vi) authenticating the host computer and the NVDIMM as a recognized host/NVDIMM pair based on the first and second acknowledgements.

DETAILED DESCRIPTION

Authenticating a host computer and NVDIMM pair using lookup tables for a challenge/response exchange between the pair of devices. The NVDIMM is challenged by the host computer for which a response associated with the physically unclonable function of a NVDIMM component is provided. The NVDIMM challenges the host computer for which a response associated with the physically unclonable function of a host computer component is provided. Additional security stores a modified response associated with run-time physically unclonable functions associated with the host computer and NVDIMM pair for use in future challenge/response exchanges.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
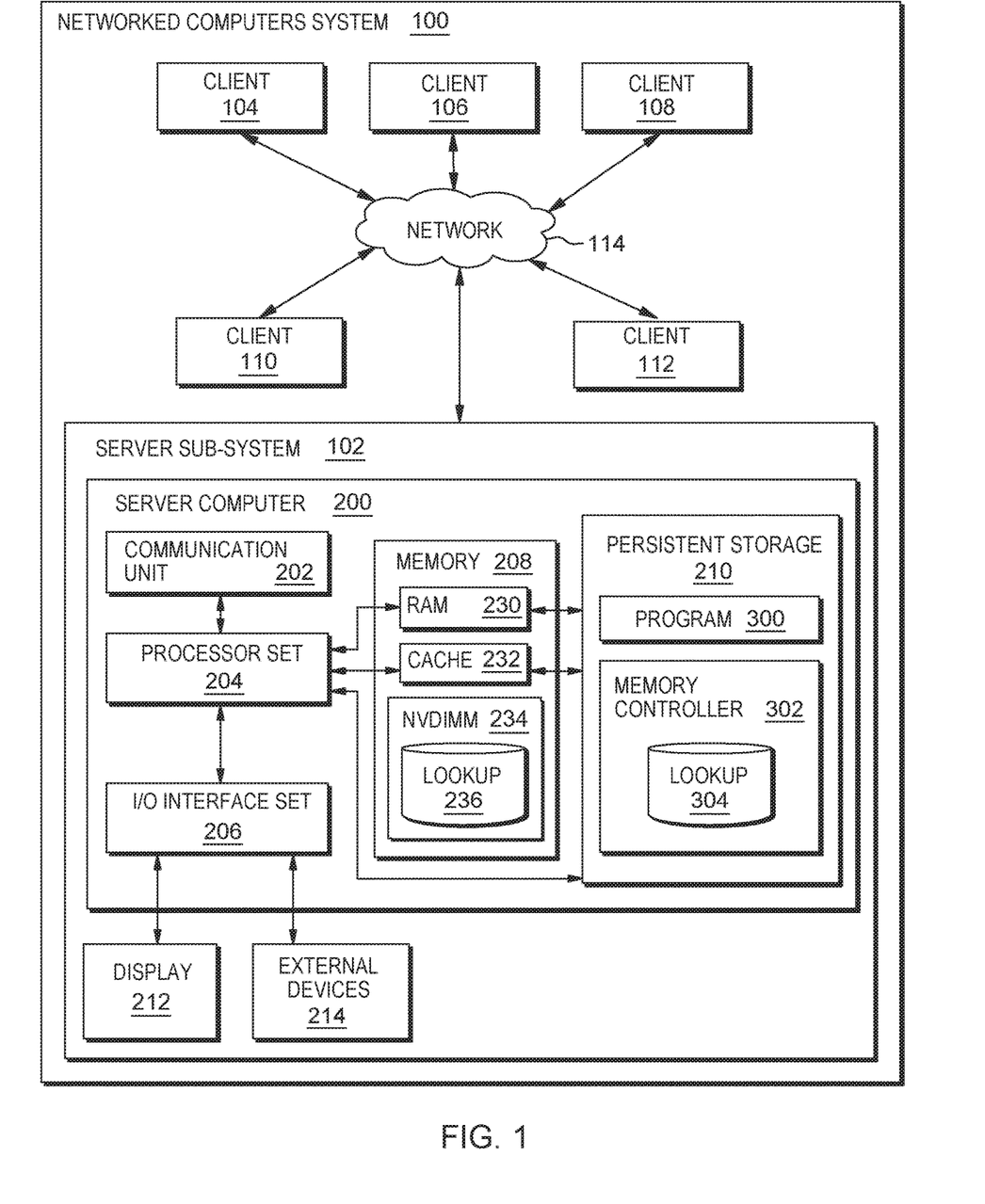
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; non-volatile dual in-line memory module (NVDIMM) 234; lookup table 236; NVDIMM security program 300; memory controller 302; and lookup table 304.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
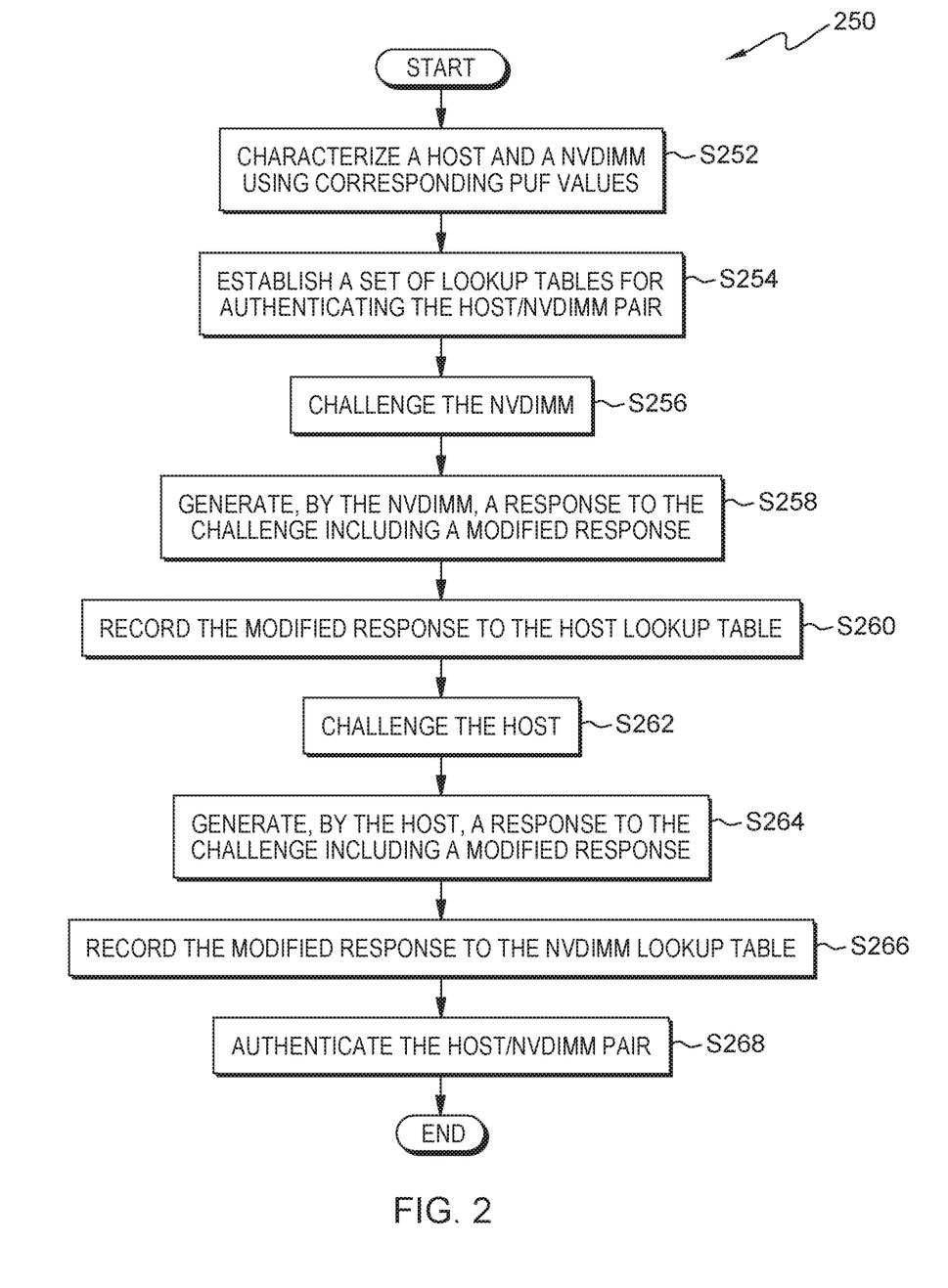
FIG. 2 is a flowchart showing a first embodiment method performed, at least in part, by the first embodiment system.
Figure 3:
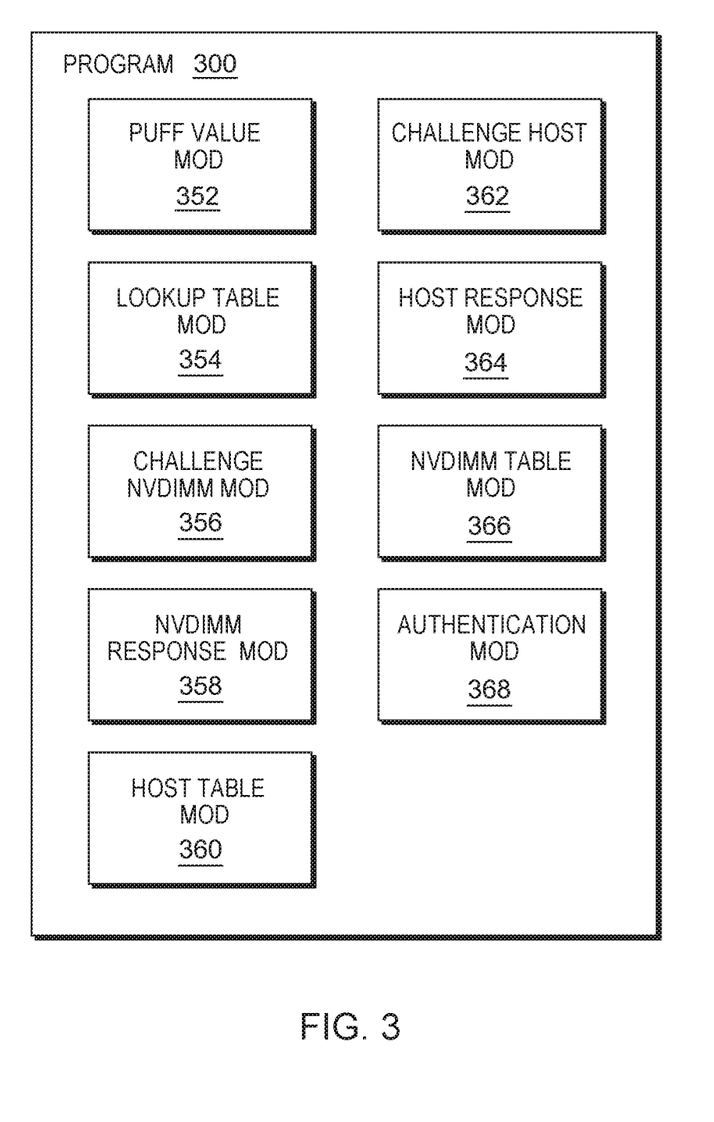
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, NVDIMM security program 300 performs or controls performance of at least some of the method operations of flowchart 250. This method and associated software will now be discussed, over the course of the following paragraphs, with extensive reference to the blocks of FIG. 1 (system of an embodiment of a hardware and software environment), FIG. 2 (method of operation blocks) and FIG. 3 (software blocks).

Processing begins at operation S252 where PUF value (physical unclonable function) module ("mod") 352 characterizes host computer 200 and NVDIMM (non-volatile dual in-line memory module) 234 using corresponding PUF values. This process is the beginning step of protecting data stored in the non-volatile portion of the NVDIMM. In this example, the host computer is characterized by the PUF value of the motherboard, the board PUF, and the NVDIMM is characterized by the PUF value of the DRAM of the NVDIMM, the DRAM PUF. Alternatively, other components of the host computer and the NVDIMM serve as the basis of the characterizing PUF values. Alternatively, the PUF value is generated using switching time characteristics of the non-volatile memory. Alternatively, the PUF value is generated using cell error rate distribution of the non-volatile memory. As discussed above, the PUF value is an unique electrical response of a circuit to a stimulus. During operation of a circuit a runtime PUF is produced that is different than a baseline PUF produced during a characterization phase. According to some embodiments of the present invention, the PUF value obtained during the characterization phase is only used during the boot sequence or boot process.

Processing proceeds to operation S254 where lookup table mod 354 establishes a set of lookup tables, 236, 304 for authenticating the host/NVDIMM pair. This process uses the board PUF as a key for the host computer and uses the DRAM (dynamic random-access memory) PUF as a key for the NVDIMM. In this example, two lookup tables make up the set of lookup tables, one stored in the NVDIMM (lookup table 236) and the other stored in the memory controller (lookup table 304). The lookup tables include a challenge phrase column, a response column containing the response to be provided by the challenged device, and a new response column to be filled in when the challenged device provides a modified response. In this example, the lookup table contains a list of challenges and corresponding responses. During operation, each challenge is responded to with a response for authentication and a modified response. The modified response is recorded as being the authenticating response the next time the same challenge is provided. This modified response includes a runtime PUF value that replaces the original PUF value obtained during the characterization phase. Alternatively, the lookup table contains a list of challenges and a first response to the first challenge. During a pre-determined period of operation, the challenge is responded to with a response for authentication and a modified response. The modified response is recorded as being the response to the next listed challenge. After each listed challenge is provided for authentication, the process starts over and the response to the first challenge phrase is recorded as being the last received modified response. In that way, challenges are cycled through a finite table of challenge phrases.

Processing proceeds to operation S256 where challenge NVDIMM mod 356 performs a challenge to the NVDIMM. This process uses an encrypted challenge response to authenticate a legitimate host/NVDIMM pair. In the example, the host computer challenges the NVDIMM with the first challenge phrase of lookup table 304 and awaits an authenticating response listed in the lookup table. Alternatively, a random challenge phrase is selected from the lookup table and the corresponding authenticating response is awaited.

Processing proceeds to operation S258 where NVDIMM response mod 358 generates, by the NVDIMM, a response to the host memory controller a response to the challenge including a modified response. In this example, the response from the NVDIMM is based on the PUF value obtained during characterization of the NVDIMM and a modified response based on a runtime PUF value responsive to the same challenge. Alternatively, the NVDIMM responds with the corresponding PUF-value-based response associated with the received challenge in lookup table 236 and a modified response based on a runtime PUF value responsive to the received challenge.

Processing proceeds to operation S260 where host table mod 360 records the modified response to the host lookup table. This process updates the responses to the challenges to make the method robust against "man-in-the-middle" attacks. In this example, server computer 200 communicates with host memory controller 302 to replace the original, or previous response, with a modified response in the lookup table.

Processing proceeds to operation S262 where challenge host mod 362 challenges the host memory controller. In the example, the host computer challenges the memory controller with the first challenge phrase of lookup table 236 and awaits an authenticating response listed in the lookup table. Alternatively, a random challenge phrase is selected from the lookup table and the corresponding authenticating response is awaited. This process is similar to the process outlined above in operation S256.

Processing proceeds to operation S264 where host response mod 364 generates, by the host, a response to the challenge including a modified response. In this example, the response from the memory controller is based on the PUF value obtained during characterization of the memory controller a modified response based on a runtime PUF value responsive to the same challenge. Alternatively, the memory controller responds with the corresponding PUF-value-based response associated with the received challenge in lookup table 304 and a modified response based on a runtime PUF value responsive to the received challenge. This process is similar to the process outlined above in operation S258.

Processing proceeds to operation S266 where NVDIMM table mod 366 records the modified response to the NVDIMM lookup table. In this example, server computer 200 communicates with NVDIMM 234 to replace the original, or previous response, with a modified response in the lookup table. This process is similar to the process outlined above in operation S260 where the update to the lookup table makes the method robust against "man-in-the-middle" attacks.

Processing ends at operation S268 where authentication mod 368 authenticates the host/NVDIMM pair. This process of using PUF values makes the host/NVDIMM pair less susceptible to security issues in the supply chain stage. In this example, the authentication between the memory controller and the NVDIMM is positively established, providing security against attacks.

III. Further Comments and/or Embodiments

In addition to the operations outlined in the above paragraphs, further embodiments of the present invention will now be discussed, again referencing FIG. 4, block diagram 500; FIG. 5A, table 600a; and FIG. 5B, table 600b.

Figure 4:
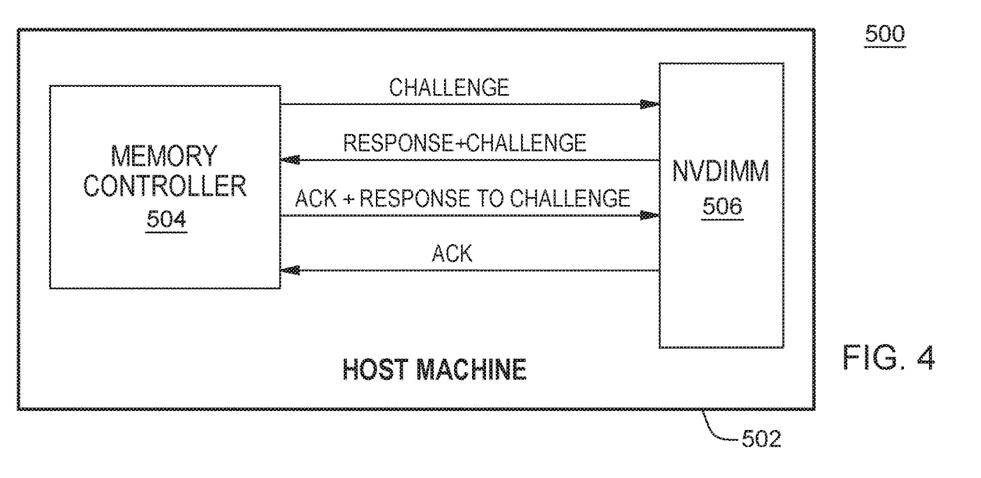
FIG. 4 is a block diagram according to an embodiment of the present invention.
Figure 5A:
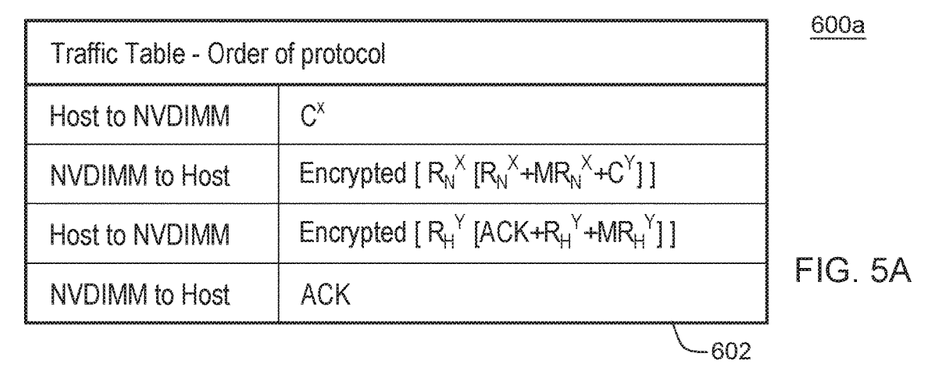
FIGS. 5A and 5B are data tables according to an embodiment of the present invention.
Figure 5B:
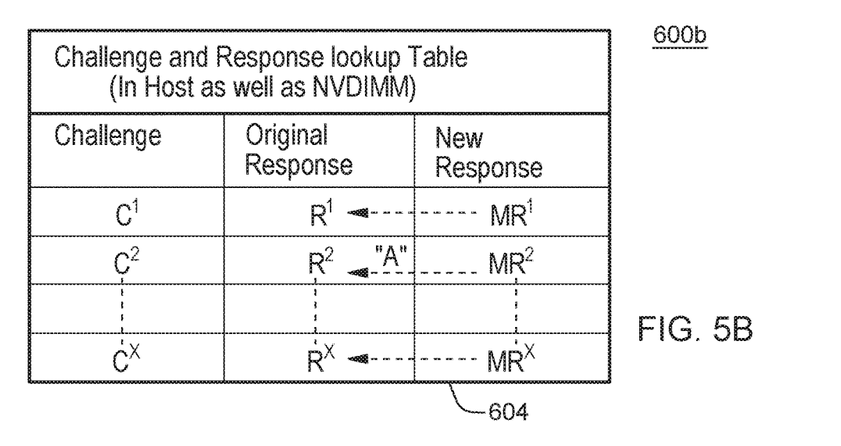

As shown in FIG. 4, block diagram 500, host machine 502 contains memory controller 504. memory controller 504 has two-way communication with NVDIMM 506. These communication operations are summarized in traffic table 600a of FIG. 5A. The challenge and lookup table 600b of FIG. 5B, illustrates how challenge $C^x$, original response $R^x$, and new (modified) response $MR^x$ interact to provide the security between host memory controller 504 and NVDIMM 506 in FIG. 4, block diagram 500.

In one embodiment of the present invention, the NVDIMM is secured during the computer boot process. Referencing FIG. 6, flowchart 700, operation S702 starts the process. At operation S704, the boot sequence is initiated. At operation S706, the NVDIMM is challenged and a response is obtained by the host. At operation S708, a determination is made if the challenge between the host and NVDIMM was successful. If "YES," the boot process continues. If "NO," the NVDIMM is put into guard mode.

Similarly, in another embodiment of the present invention, the NVDIMM is secured during computer runtime. Referencing FIG. 7, flowchart 800, operation S802 starts the process. At operation S804, the first R/W (read/write) access request to the non-volatile portion of the NVDIMM from a privileged host process is detected. At operation S806, the NVDIMM is challenged and a response is obtained by the host. At operation S808, a determination is made if the challenge between the host and NVDIMM was successful. If "YES," an initiate transfer is performed. If "NO," the NVDIMM is put into guard mode.

Some embodiments of the present invention obtain a PUF value for the NVDIMM via the DRAM during a characterization phase prior to a first boot sequence. Accordingly, during the boot sequence, the PUF value obtained during the characterization phase is the basis for the authenticating response from the NVDIMM as in FIG. 6. Continuing with this example, responses generated after the first boot sequence are based on a runtime PUF value, for example, a response generated responsive to a first read/write access as in FIG. 7.

Some embodiments of the present invention perform are directed to a process for protecting data stored in the non-volatile portion of an NVDIMM including: (i) determining a first physically unclonable function (PUF) associated with a host via a host circuit board; (ii) determining a second PUF associated with a dynamic random-access memory (NVDIMM); (iii) during a first boot sequence, authenticating the host and the NVDIMM as a working pair of devices with a challenge/response process including the first PUF and the second PUF; (iv) incrementing a variable of the challenge response process to generate a revised authentication process including an updated challenge response process; and (v) responsive to an access request to a non-volatile portion of the NVDIMM, performing the updated challenge response process with the NVDIMM. The first PUF and the second PUF are obtained during a device characterization phase of NVDIMM installation with the host.

Some embodiments of the present invention recognize the following facts, potential problems and/or potential areas for improvement with respect to the current state of the art: (i) data can be stored in the non-volatile portion of the NVDIMM (non-volatile dual in-line memory module); (ii) it is possible to load malware on a legitimate server by storing it on the non-volatile portion of the NVDIMM; (iii) when the server gets powered on with a swapped NVDIMM there is a genuine risk of sensitive data getting compromised; (iv) data in an NVDIMM can be used in a different server that requires the presence of a handshake mechanism that indicates to the different server that the NVDIMM that has been plugged in is a valid one and vice versa; (v) using password based authentication methods makes it susceptible to duplication; and (vi) does not.

A method according to an embodiment of the present invention to protect data stored in the non-volatile portion of NVDIMM includes the following operations (not necessarily in the following order): (i) using an encrypted challenge response to authenticate legitimate host/NVDIMM pair; (ii) using board PUF (physically unclonable functions) as a key for the host and DRAM PUF as a key for the NVDIMM; (iii) periodically updating the responses to challenges to make the method robust against man-in-the-middle attacks; and (iv) using PUF values obtained during device characterization phase so that the first exchange consists of known values (to legitimate users) but still unique to the host/NVDIMM, thus making it less susceptible to security issues in the supply chain stage.

FIG. 4, block diagram 500 is a system that includes the following: host machine 502; memory controller 504; and NVDIMM 506. In this figure, communication paths are illustrated where "Challenge" communication flows from the memory controller to the NVDIMM, "Response+Challenge" communication flows from the NVDIMM to the memory controller; "ACK (acknowledgement)"+Response to Challenge" communication flows from the memory controller to the NVDIMM; and "ACK" communication flows from the NVDIMM to the memory controller.

FIG. 5A, traffic table 600a shows the order of protocol according to some embodiments of the present invention including: (i) In $R_N^X$ or $R_H^Y$—the subscript H/N denotes whether communication initiated from Host/NVDIMM; and (ii) X and Y are the challenge or responses obtained from the below lookup table.

Likewise, FIG. 5B, table 600b shows a challenge and response lookup table (in host as well as NVDIMM) according to some embodiments of the present invention including: (i) when a new modified response is received, the original response is replaced by the new response (see "A" in FIG. 5B); and (ii) the new modified response is placed in the new response column.

In some embodiments of the present invention, the algorithm is implemented as follows: (i) the host and the NVDIMMs media controller are populated with a challenge response lookup table; (ii) the initial values consist of responses that are populated using PUF values obtained during the characterization phase on both the devices; (iii) for each challenge response exchange, a new response is also generated using run time PUF values as a key; (iv) exchanges happen every time the NVDIMM or the host power cycles (goes offline and then comes back online); (v) every exchange consists of the following: (a) the host sends a challenge to the NVDIMM ($C^X$), (b) the NVDIMM sends back an encrypted response, (c) the data consists of the response to the challenge ($R_N^X$), the modified response to challenge ($MRN^X$) and a challenge to the host ($C^Y$), (d) the data is encrypted using the response $R_N^X$ which is the expected value by the host and hence which has the key to correctly decrypt, (e) encryption ensures that even if there is an intermediate component sniffing traffic it will never guess the correct response as that keeps changing due to encryption and the new modified response that gets generated for every challenge, (f) the host sends back an encrypted response, (g) the data consists of the ACK, the response to challenge ($R_H^Y$), and the modified response to challenge ($MR_H^Y$), (h) the data is again encrypted, this time by using the response $R_H^Y$, and (i) the NVDIMM responds back with an ACK; (vi) the modified response is placed in the new response column; (vii) after the first exchange for every new exchange, the contents of the new response column are placed in the original response and the new modified response obtained is placed under the new response column; (viii) if the exchange is unsuccessful then the following is carried out: (a) the NVDIMM is put into guard mode, and (b) this ensures that even if there is a breach, the data does not get compromised.

Figure 6:
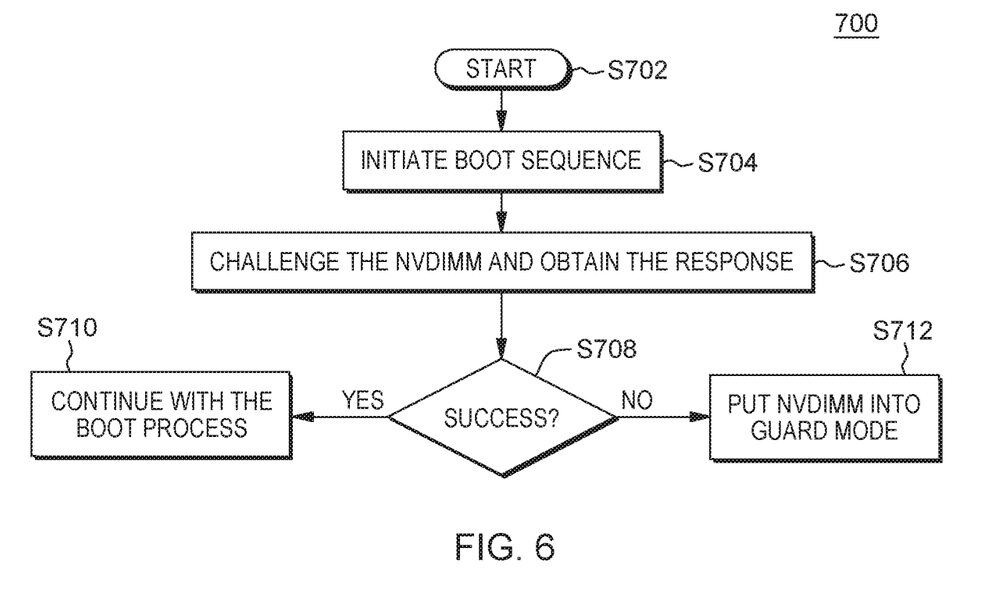
FIG. 6 is a first flowchart according to an embodiment of the present invention.

FIG. 6, flowchart 700 shows the NVDIMM security during boot and includes the following: (i) start operation block S702; (ii) initiate boot sequence block S704; (iii) challenge the NVDIMM and obtain the response block S706; (iv) success decision block S708; (v) continue with the boot process block S710; and (vi) put NVDIMM into guard mode block S712.

Figure 7:
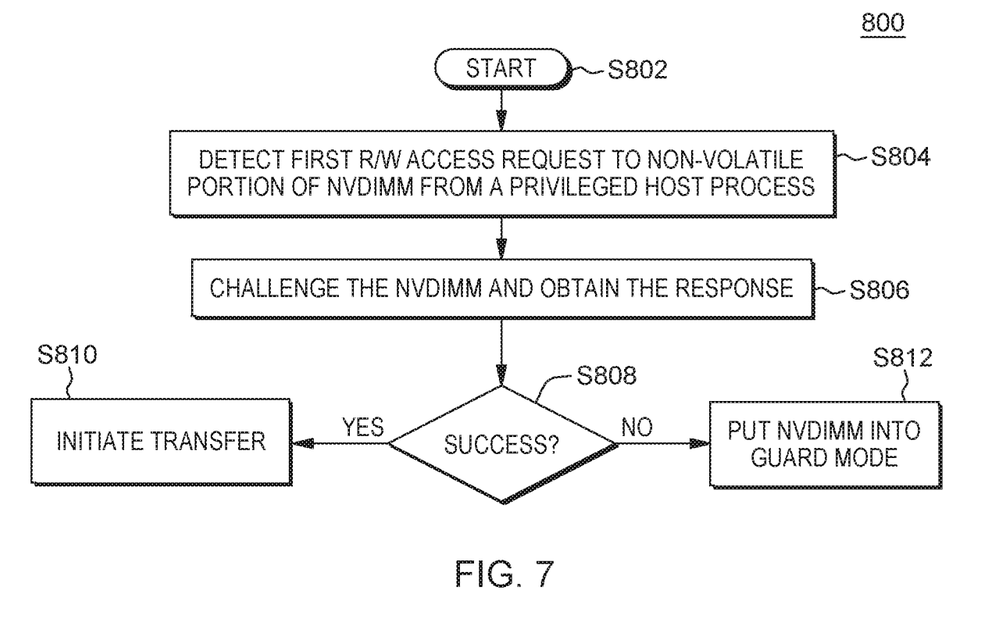
FIG. 7 is a second flowchart according to an embodiment of the present invention.

FIG. 7, flowchart 800 shows the NVDIMM security during runtime and includes the following: (i) start operation block S802; (ii) detect first R/W (read/write) access request to non-volatile portion of NVDIMM from a privileged host process block S804; (iii) challenge the NVDIMM and obtain the response block S806; (iv) success decision block S808; (v) initiate transfer block S810; and (vi) put NVDIMM into guard mode block S812.

Some embodiments of the present invention may include one, or more, of the following operations, features, characteristics and/or advantages: (i) assumes that any of the available PUF methods already in literature would be picked up and used; (ii) the key value pair keeps getting updated over time, thereby giving additional protection from man-in-the-middle attacks; (iii) does not require a lot of changes to the chip setup as well as needing additional hardware requirements (additional secure bus/additional namespaces); (iv) the key value pair keeps getting updated over time, thereby giving additional protection; (v) is used for real time traffic on the wire; (vi) incorporates two types of PUF; (vii) incorporates updating of the challenge response; (viii) does not require modified protocol for communication between the system memory controller and the non-volatile memory; (ix) does not require additional logic to be stored at the memory controller in order to generate a new key/value pair; and/or (x) uses process variations and intrinsic electrical characteristic variations of the hardware to generate a unique signature that cannot be duplicated making embodiments of the present invention sturdy to external attacks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for authenticating a host/NVDIMM pair, the method comprising:
   determining a first physically unclonable function (PUF), with the PUF being based on electrical variations of a host circuit board located in the host that form a signature unique to that particular host circuit board hardware;
   determining a second PUF associated with electrical variations of the NVDIMM that form a signature unique to that particular NVDIMM hardware;
   performing a challenge response to identify the host based on the first PUF,
   to identify the NVDIMM based on the second PUF and to determine that the NVDIMM does not match an appropriate host; and
   responsive to the determination that the NVDIMM does not match an appropriate host, putting the NVDIMM in guard mode to allow for resolution of the mismatch in host and NVDIMM hardware.

2. The computer-implemented method of claim 1 further comprising:
   prior to the performance of the challenge response, generating a lookup table that includes: (i) a record indicating a set of allowable NVDIMM(s) that is properly accessible by the host, and (i) a set of allowable host(s) that is properly accessible by the NVDIMM;
   wherein the determination that the NVDIMM does not match the host includes accessing the lookup table to determine that the NVDIMM and the host are not a proper match.

3. A computer program product for authenticating a host/NVDIMM pair, the computer program product comprising:
   a set of storage device(s); and
   computer code stored collectively in the set of storage device(s), with the computer code including data and instructions to cause a processor(s) set to perform at least the following operations:
- determining a first physically unclonable function (PUF), with the PUF being based on electrical variations of a host circuit board located in the host that form a signature unique to that particular host circuit board hardware,
- determining a second PUF associated with electrical variations of the NVDIMM that form a signature unique to that particular NVDIMM hardware,
- performing a challenge response to identify the host based on the first PUF, to identify the NVDIMM based on the second PUF and to determine that the NVDIMM does not match an appropriate host, and
- responsive to the determination that the NVDIMM does not match an appropriate host, putting the NVDIMM in guard mode to allow for resolution of the mismatch in host and NVDIMM hardware.

4. The computer program product of claim 3 wherein the computer code further includes instructions for causing the processor(s) set to perform the following operation(s):
- prior to the performance of the challenge response, generating a lookup table that includes: (i) a record indicating a set of allowable NVDIMM(s) that is properly accessible by the host, and (i) a set of allowable host(s) that is properly accessible by the NVDIMM;
- wherein the determination that the NVDIMM does not match the host includes accessing the lookup table to determine that the NVDIMM and the host are not a proper match.

5. A computer system for authenticating a host/NVDIMM pair, the computer system comprising:
- a processor(s) set;
- a set of storage device(s); and
- computer code stored collectively in the set of storage device(s), with the computer code including data and instructions to cause the processor(s) set to perform at least the following operations:
  - determining a first physically unclonable function (PUF), with the PUF being based on electrical variations of a host circuit board located in the host that form a signature unique to that particular host circuit board hardware,
  - determining a second PUF associated with electrical variations of the NVDIMM that form a signature unique to that particular NVDIMM hardware,
  - performing a challenge response to identify the host based on the first PUF, to identify the NVDIMM based on the second PUF and to determine that the NVDIMM does not match an appropriate host, and
  - responsive to the determination that the NVDIMM does not match an appropriate host, putting the NVDIMM in guard mode to allow for resolution of the mismatch in host and NVDIMM hardware.

6. The computer system of claim 5 wherein the computer code further includes instructions for causing the processor(s) set to perform the following operation(s):
- prior to the performance of the challenge response, generating a lookup table that includes: (i) a record indicating a set of allowable NVDIMM(s) that is properly accessible by the host, and (i) a set of allowable host(s) that is properly accessible by the NVDIMM;
- wherein the determination that the NVDIMM does not match the host includes accessing the lookup table to determine that the NVDIMM and the host are not a proper match.

* * * * *